(12) United States Patent
Lu

(10) Patent No.: US 9,057,442 B2
(45) Date of Patent: Jun. 16, 2015

(54) STRUCTURE OF PISTON RING

(71) Applicant: Tai Mao Industrial Corp., Tainan (TW)

(72) Inventor: Wan-Jie Lu, Tainan (TW)

(73) Assignee: C.T.I. TRAFFIC INDUSTRIES CO., LTD., Tainan (TW)

( * ) Notice: Subject to any disclaimer, the term of this patent is extended or adjusted under 35 U.S.C. 154(b) by 0 days.

(21) Appl. No.: 14/450,564

(22) Filed: Aug. 4, 2014

(65) Prior Publication Data

US 2014/0339778 A1    Nov. 20, 2014

Related U.S. Application Data

(62) Division of application No. 13/787,935, filed on Mar. 7, 2013, now abandoned.

(30) Foreign Application Priority Data

Jun. 19, 2012 (TW) .............................. 101121889 A

(51) Int. Cl.
  *C23C 14/06* (2006.01)
  *F16J 9/26* (2006.01)
  *F16J 9/06* (2006.01)

(52) U.S. Cl.
  CPC ... *F16J 9/26* (2013.01); *F16J 9/062* (2013.01)

(58) Field of Classification Search
  CPC ..................................... F16J 9/26; F16J 9/062
  USPC ............ 277/434, 440, 442, 443, 444; 75/252, 75/255; 427/466, 451; 428/570; 123/45 R
  See application file for complete search history.

(56) References Cited

U.S. PATENT DOCUMENTS

| | | | |
|---|---|---|---|
| 3,936,295 A | 2/1976 | Cromwell et al. | ............... 75/252 |
| 5,316,321 A | 5/1994 | Ishida et al. | |
| 6,060,182 A | 5/2000 | Tanaka et al. | |
| 6,325,385 B1 | 12/2001 | Iwashita et al. | ............... 277/442 |
| 7,077,402 B2 | 7/2006 | Katumaru et al. | |
| 2011/0020551 A1 | 1/2011 | Dekempeneer | ............... 427/327 |
| 2013/0004756 A1 | 1/2013 | Kennedy et al. | ............... 428/216 |

FOREIGN PATENT DOCUMENTS

WO    WO2011125375 A1    10/2011

*Primary Examiner* — Gilbert Lee
(74) *Attorney, Agent, or Firm* — CKC & Partners Co., Ltd.

(57) ABSTRACT

A structure of a piston ring to be installed in an engine includes a matrix. A laminated intermediate layer is formed on a surface of the matrix from hard chromium (Cr), chromium nitride (CrN) and titanium carbide (TiC) in order, and a diamond-like carbon film (DLC) is coated on an outer periphery of the intermediate layer. Thus, the piston ring is wrapped by a skin with a progressive structure having a gradient distribution of hardness. The structure formed from the diamond-like carbon film provides a low wear rate and a low friction coefficient, while applying a high bonding force to the matrix and making the piston ring have an improved normal service life that meets the related environmental regulations.

2 Claims, 5 Drawing Sheets ically the hardness is progressively lowered # STRUCTURE OF PISTON RING

CROSS REFERENCE

The present application is a division of U.S. application Ser. No. 13/787,935 filed on Mar. 7, 2013, now abandoned.

BACKGROUND OF THE INVENTION

1. Technical Field

The present invention relates to a structure of a piston ring that is configured to be installed in an engine and has a matrix with a laminated intermediate layer coated on a surface of the matrix and a diamond-like carbon film coated on an outer periphery of the intermediate layer. Thus, the piston ring is wrapped by a skin with a progressive structure having a gradient distribution of hardness. The structure formed from the diamond-like carbon film provides expected low wear rate and low friction coefficient, while applying a high bonding force to the matrix and making the piston ring have a long service life as the related environmental regulations require.

2. Description of Related Art

The conventional piston for being installed in a vehicle engine typically has two to three serially arranged frictional components (i.e. a compression ring, an oil ring, and a scraper ring, generally known as piston rings). The scraper ring is in the shape of a thin ring and is mounted around the piston to closely contact the inner wall of the cylinder, to prevent the engine oil within the cylinder from upward flowing to the combustion chamber. The inner wall of the cylinder is covered by a layer of oil that is supplied by the oil ring. During air intake and power strokes of the engine, the scraper ring serves to remove excess engine oil from the inner wall of the cylinder. The existing scraper ring, however, is limited in the overall structural strength and elasticity, so it tends to wear out prematurely and has a reduced service life. When the scraper ring having such poor structural strength and elasticity and coming without any special surface treatment is worn after a period of use, the consumption of engine oil is increased, so that the engine starts to waste engine oil. In addition, poor air-tightness of the piston can decrease the combustion efficiency, and in a worse case, the piston can move unstably, thereby hindering the engine from supplying power smoothly.

SUMMARY OF THE INVENTION

The present invention hence provides further improvements to the piston ring used in an engine, to make the piston ring have a low wear rate and a low friction coefficient by coating a matrix of the piston ring with a laminated intermediate layer and a diamond-like carbon film, so that the piston ring is wrapped by a skin with a progressive structure having a gradient distribution of hardness. The structure also features applying a high bonding force to the matrix and making the piston ring have a long service life that meets the related environmental regulations.

A first primary objective of the present invention is to provide a structure of a piston ring to be installed in an engine and having a matrix. A laminated intermediate layer is formed on a surface of the matrix from hard chromium (Cr), chromium nitride (CrN) and titanium carbide (TiC) in order, and a diamond-like carbon film (DLC) is coated on an outer periphery of the intermediate layer. Thus, the piston ring is wrapped by a skin with a progressive structure having a gradient distribution of hardness, and the structure formed from the diamond-like carbon film provides a low wear rate and a low friction coefficient, while applying a high bonding force to the matrix and making the piston ring have an improved normal service life that meets the related environmental regulations.

A second primary objective of the present invention is to provide a structure of a piston ring to be installed in an engine and having a matrix. A laminated intermediate layer is formed on a surface of the matrix from chromium nitride (CrN) and titanium carbide (TiC) in order, and a diamond-like carbon film (DLC) is coated on an outer periphery of the intermediate layer. Thus, the piston ring is wrapped by a skin with a progressive structure having a gradient distribution of hardness, and the structure formed from the diamond-like carbon film provides a low wear rate and a low friction coefficient, while applying a high bonding force to the matrix and making the piston ring have an improved normal service life that meets the related environmental regulations.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

Figure 1:
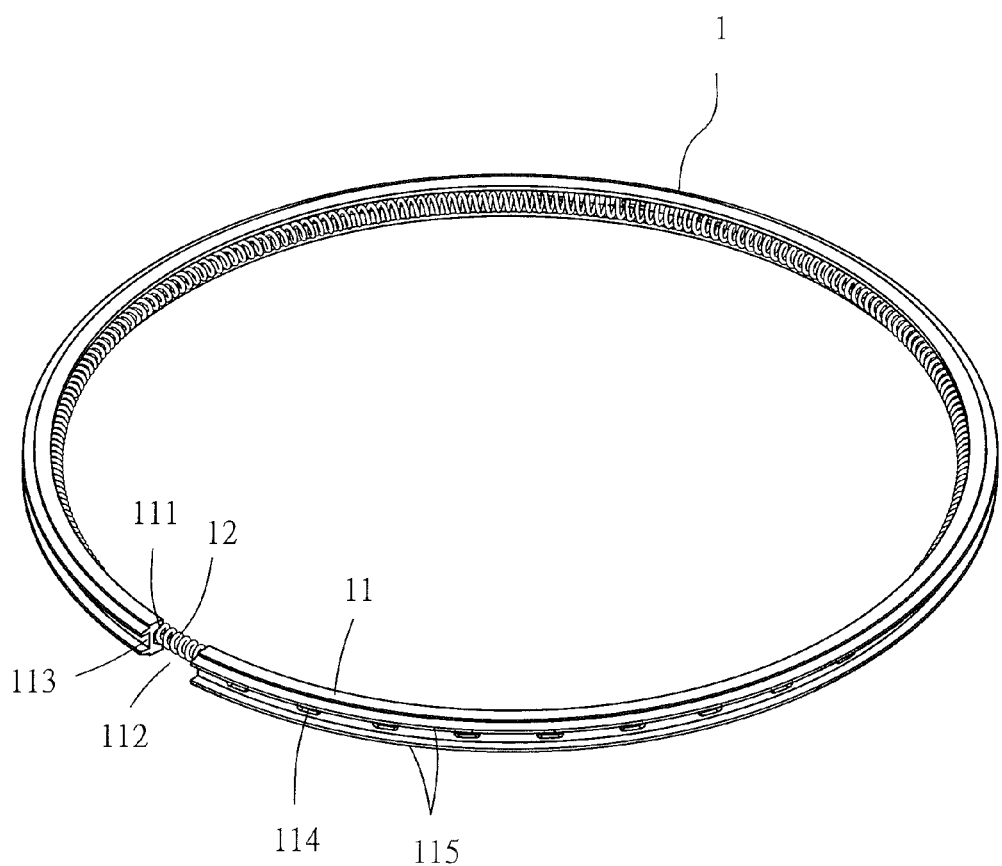
FIG. 1 is a perspective view of a piston ring according to the present invention.

According to the present invention, in one embodiment, a structure of a piston ring (as shown in FIG. 1) primarily has the piston ring (1) (herein realized by a scraper ring) to be installed in an engine. The piston ring (1) includes a ring body (11) and a spring (12). The coil spring (12) is closely fit in a positioning portion (111) formed on the ring body (11). With an extendable gap (112) provided at one segment of the ring body (11), the spring (12) can be stably positioned along an inner periphery of the ring body (11). A peripheral groove (113) is formed along an outer periphery of the ring body (11), and a plurality of through holes (114) is made at the bottom of the peripheral groove (113). The peripheral groove (113) is defined by two retaining flanges (115) running along its outer periphery, so that the piston ring (1) has a light overall weight, a small friction coefficient, and close contact with the inner wall of the cylinder.

Figure 2:
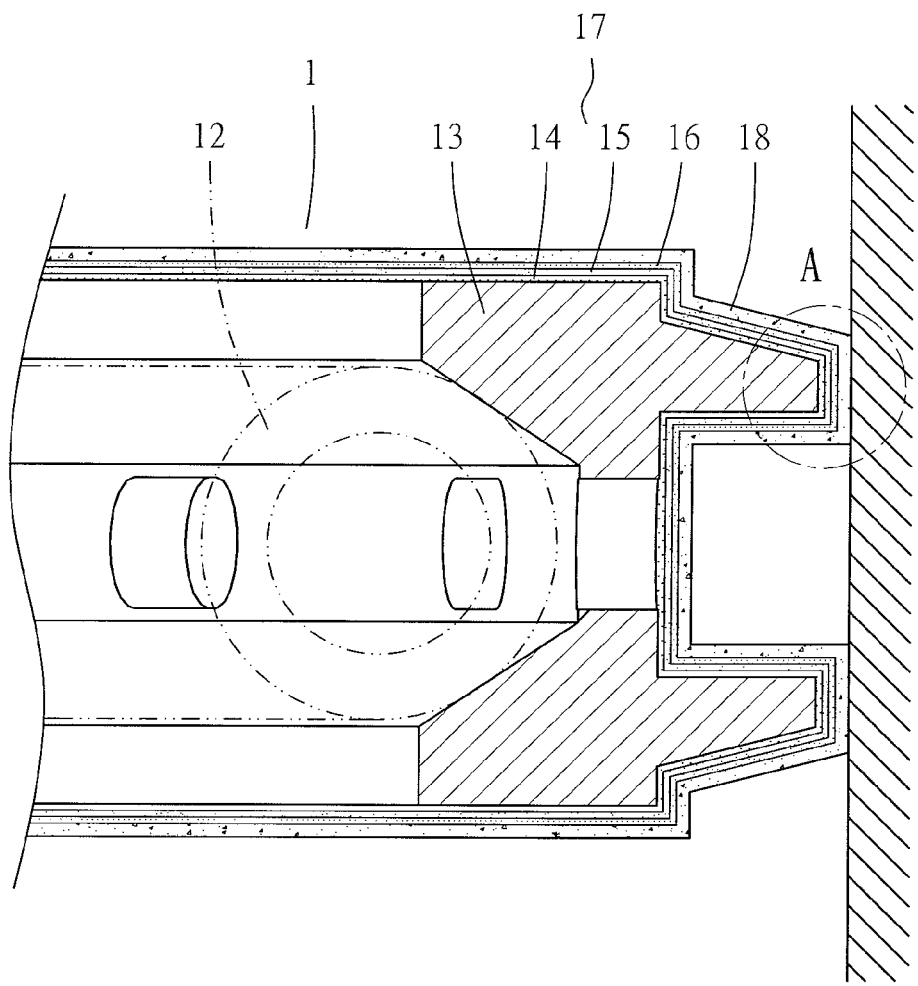
FIG. 2 is a schematic cross-sectional drawing showing the piston ring of one embodiment of the present invention installed in a cylinder and contacting an inner wall of the cylinder.
Figure 3:
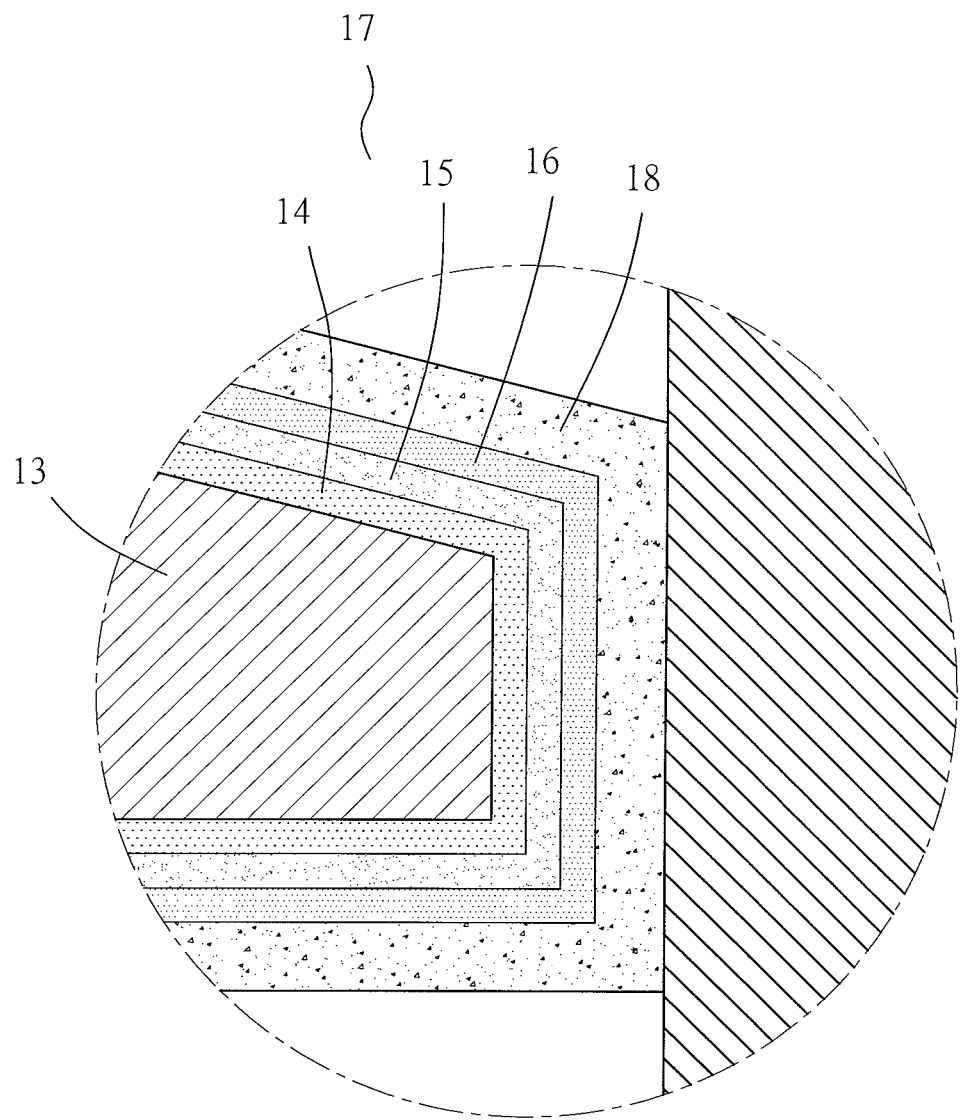
FIG. 3 is an enlarged view of Part A of FIG. 2.

The improvement enabled by the present invention is that, the piston ring (1) (as shown in FIG. 2 and FIG. 3) is covered by a laminated intermediate layer (17) that is formed on the surface of a matrix (13) from hard chromium (Cr) (14), chromium nitride (CrN) (15) and titanium carbide (TiC) (16) in order, and then covered by a diamond-like carbon film (DLC) (18) attached to the outer periphery of the intermediate layer (17). Thus, the resulting piston ring (1) is wrapped by a skin with a progressive structure having a gradient distribution of hardness (meaning that the hardness is progressively lowered from the outer surface to the interface with the matrix). The structure formed from the diamond-like carbon film provides an expected low wear rate and a low friction coefficient, while applying a high bonding force to the matrix (13) and making the piston ring (1) have a long service life as the related environmental regulations require.

Figure 4:
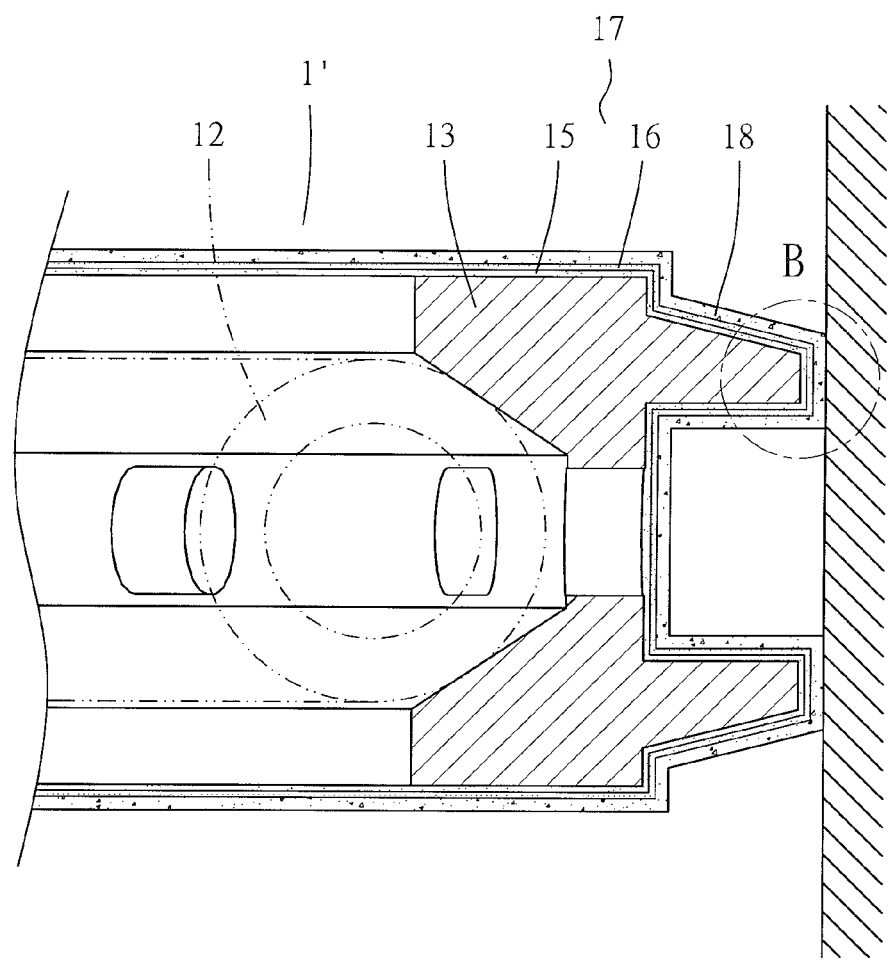
FIG. 4 is a schematic cross-sectional drawing showing the piston ring of another embodiment of the present invention installed in a cylinder and contacting an inner wall of the cylinder.
Figure 5:
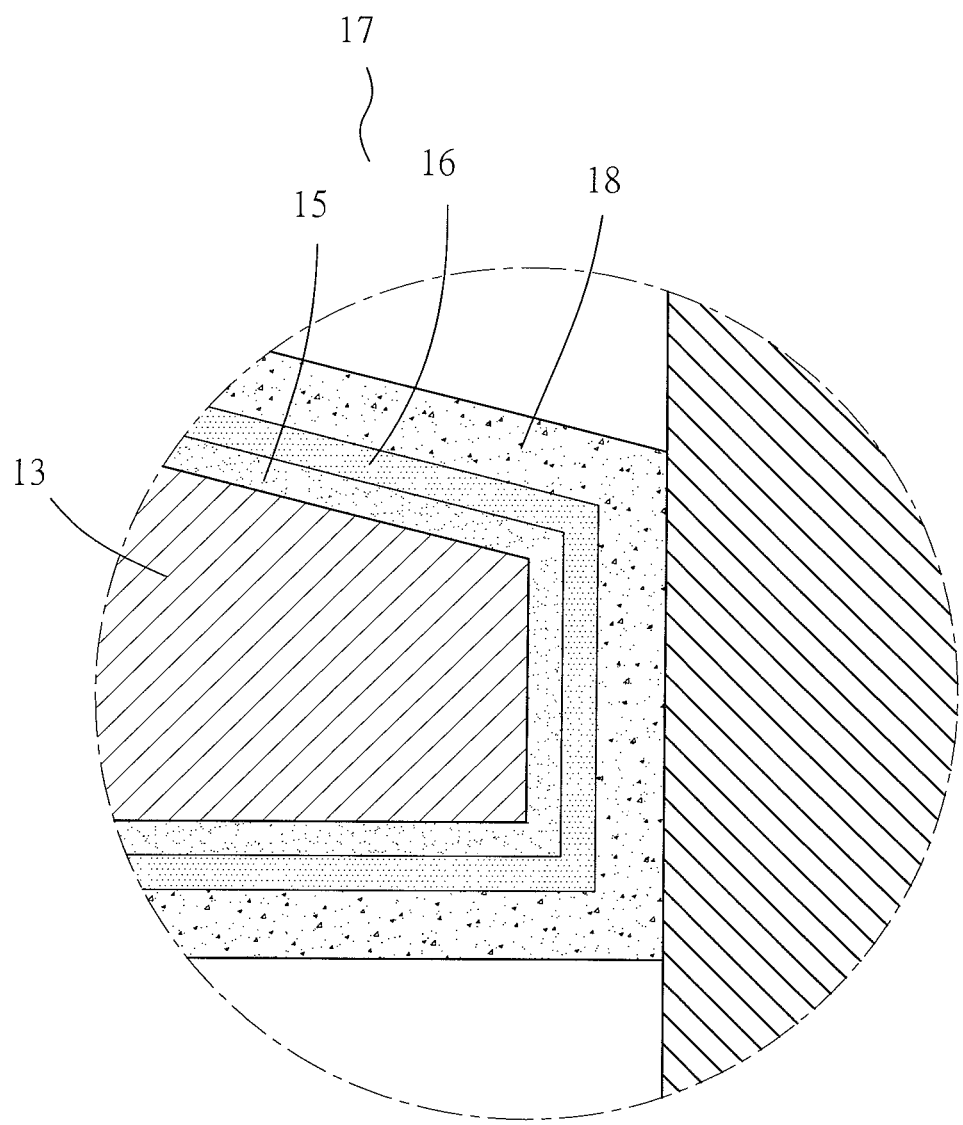
FIG. 5 is an enlarged view of Part B of FIG. 4.

In a second embodiment of the present invention, as shown in FIG. 4 and FIG. 5, the piston ring (1') (also realized by a scraper ring) is to be installed in an engine and is externally coated by a laminated intermediate layer (17). The intermediate layer (17) is formed on the surface of a matrix (13) of the piston ring (1') from chromium nitride (CrN) (15) and titanium carbide (TiC) (16) in order. Then, a diamond-like carbon film (DLC)(18) is coated on the outer periphery of the intermediate layer (17). Thereby, the resulting piston ring (1') is wrapped by a skin with a progressive structure having a gradient distribution of hardness (meaning that the hardness is progressively lowered from the outer surface to the interface with the matrix). The structure formed from the diamond-like carbon film provides an acceptable low wear rate and a low friction coefficient, while applying a high bonding force to the matrix (13) and making the piston ring (1') have an improved normal service life that meets the related environmental regulations.

What is claimed is:

1. A structure of a piston ring, comprising a matrix wherein a laminated intermediate layer is formed on an outer surface of the matrix from a hard chromium layer, a chromium nitride layer and a titanium carbide layer in order, and a diamond-like carbon film is coated on an outer periphery of the intermediate layer, wherein the hard chromium layer is in direct contact with the outer surface of the matrix, the chromium nitride layer is in direct contact with both the hard chromium layer and the titanium carbide layer, and the diamond-like carbon film is in direct contact with the titanium carbide layer, wherein the hard chromium layer, the chromium nitride layer, the titanium carbide layer and the diamond-like carbon film are processed to have a hardness which is progressively lowered from the diamond-like carbon film to the hard chromium layer in order.

2. A structure of a piston ring, comprising a matrix wherein a laminated intermediate layer is formed on a surface of the matrix from a chromium nitride layer and a titanium carbide layer in order, and a diamond-like carbon film is coated on an outer periphery of the intermediate layer, wherein the chromium nitride layer is in direct contact with the outer surface of the matrix, and the titanium carbide layer is in direct contact with both the chromium nitride layer and the diamond-like carbon film, wherein the chromium nitride layer, the titanium carbide layer and the diamond-like carbon film are processed to have a hardness which is progressively lowered from the diamond-like carbon film to the chromium nitride layer in order.

\* \* \* \* \*